United States Patent
Besnard et al.

(10) Patent No.: US 12,537,222 B2
(45) Date of Patent: Jan. 27, 2026

(54) ELECTROCHEMICAL CELL WITH THREE-DIMENSIONAL ELECTRODE STRUCTURE

(71) Applicant: RENAULT S.A.S, Boulogne-Billancourt (FR)

(72) Inventors: Nicolas Besnard, Paris (FR); Victor Chaudoy, Paris (FR); David Leray, Gif sur yvette (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 694 days.

(21) Appl. No.: 17/786,367

(22) PCT Filed: Dec. 15, 2020

(86) PCT No.: PCT/EP2020/086234
§ 371 (c)(1),
(2) Date: Jul. 6, 2022

(87) PCT Pub. No.: WO2021/122606
PCT Pub. Date: Jun. 24, 2021

(65) Prior Publication Data
US 2023/0021008 A1     Jan. 19, 2023

(30) Foreign Application Priority Data
Dec. 17, 2019   (FR) ...................................... 1914688

(51) Int. Cl.
*H01M 10/0562* (2010.01)
*H01M 4/66* (2006.01)
(Continued)

(52) U.S. Cl.
CPC ......... *H01M 10/0562* (2013.01); *H01M 4/66* (2013.01); *H01M 10/0565* (2013.01);
(Continued)

(58) Field of Classification Search
None
See application file for complete search history.

(56) References Cited

U.S. PATENT DOCUMENTS 8,574,744 B1   11/2013   Teeters et al.
8,865,345 B1   10/2014   Ramasubramanian et al.
(Continued)

FOREIGN PATENT DOCUMENTS

CN   104733702 A   6/2015
EP   1 048 091 A1   11/2000

OTHER PUBLICATIONS

International Search Report issued Feb. 26, 2021, in PCT/EP2020/086234 filed Dec. 15, 2020, 3 pages.
(Continued)

*Primary Examiner* — Jeffrey T Barton
(74) *Attorney, Agent, or Firm* — Oblon, McClelland, Maier & Neustadt, L.L.P.

(57) ABSTRACT

An electrochemical cell includes a casing that: includes a lower first element in the form of a vessel, the internal surface of which is at least partially covered by a layer of conductive material so as to form the current collector of the first electrode with a first polarity; includes an upper second element in the form of a cover for closing the vessel; houses a three-dimensional electrode structure with a first electric polarity; houses a three-dimensional electrode structure with a second electric polarity opposite to the first electric polarity; and contains an electrolyte as an ionic conductive medium. The three-dimensional electrode structure with the second electric polarity includes a series of electrodes with a second polarity, each of which is an elongated body with a vertical orientation.

13 Claims, 10 Drawing Sheets

(51) Int. Cl.
  *H01M 10/0565* (2010.01)
  *H01M 50/15* (2021.01)
  *H01M 4/02* (2006.01)

(52) U.S. Cl.
  CPC ...... *H01M 50/15* (2021.01); *H01M 2004/027* (2013.01); *H01M 2004/028* (2013.01)

(56) References Cited

U.S. PATENT DOCUMENTS

| | | |
|---|---|---|
| 2013/0052537 A1 | 2/2013 | Takeuchi et al. |
| 2014/0106232 A1 | 4/2014 | Teeters et al. |
| 2017/0005338 A1 | 1/2017 | Human |
| 2017/0149034 A1* | 5/2017 | Jeong ................ H01M 10/0585 |
| 2019/0221840 A1* | 7/2019 | Okuda .................. H01M 4/368 |
| 2019/0379012 A1* | 12/2019 | Mizuguchi .......... H01M 50/124 |

OTHER PUBLICATIONS

French Preliminary Search Report issued Jul. 29, 2020, in French Application No. 1914688 filed Dec. 17, 2019, (with English Translation of Categories of Cited Documents), 3 pages.

\* cited by examiner

ELECTROCHEMICAL CELL WITH THREE-DIMENSIONAL ELECTRODE STRUCTURE

TECHNICAL FIELD OF THE INVENTION

The present invention relates to an electrochemical cell with a three-dimensional electrode structure.

The invention particularly relates to an electrochemical cell with a three-dimensional electrode structure and a solid electrolyte.

TECHNICAL BACKGROUND

Battery systems, also called electric batteries and/or accumulators, are made up of various elements or sub-assemblies of various scales such as: materials; electrodes; cells; modules; packs.

The transition from one scale to another causes volume and mass losses that directly affect the mass electrical energy storage capacity of a system, also called the energy density of the system, due to the addition of packaging, electrical connection components, etc.

The size of a cell is limited by its assembly method, which involves stacking electrode layers and separators. The electrodes are thin and the number of layers remains limited since the problems of alignment particularly need to be taken into account and addressed.

Indeed, the more the number of layers increases, the more the risks of loss of alignment increase, which limits the dimensions (thickness, length, width) of the cells.

The technical problem to be addressed involves being able to increase the volume of the cells, which is dependent on the methods for shaping and assembling conventional cells. Increasing the volume of the cells allows the filling ratio of the packs to be increased, by removing some of the non-active materials and allows the number of cells to be reduced.

Document EP-A1-3.157.090 already proposes a cell with a three-dimensional structure of nested and interposed electrodes.

Such a design allows several negative and positive electrodes to be simultaneously nested in a single step. However, the electrodes are flat and are obtained using conventional coating techniques. The size scale of electrodes remains small, resulting in risks of faults when aligning the electrodes.

In addition, precise dimensioning of the electrodes is critical because, during insertion, the electrodes must precisely fill the available space, at the risk of causing false contacts. The thickness homogeneity of the electrodes is critical and difficult to guarantee.

The aim of the invention is to propose a new design of an electrochemical cell with a three-dimensional electrode(s) structure that overcomes the aforementioned disadvantages.

SUMMARY OF THE INVENTION

The invention proposes an electrochemical cell, characterized in that it comprises a casing, which:
- comprises a lower first element in the form of a vessel, the internal surface of which is at least partially covered with a layer of conductive material so as to form the current collector of the first electrode with a first polarity;
- comprises an upper second element in the form of a cover for closing the vessel;
- houses a three-dimensional electrode structure with a first electric polarity;
- houses a three-dimensional electrode structure with a second electric polarity opposite to the first electric polarity and nested in the three-dimensional electrode structure with a first polarity; and
- contains an electrolyte as an ionic conductive medium, and in that the three-dimensional electrode structure with a second polarity comprises a series of electrodes with a second polarity, each of which is an elongated body with a vertical orientation.

According to other features of the invention:
- the electrodes with a second polarity are distributed inside the casing in a regular pattern;
- the vessel houses a series of conductive elements with a first polarity, which elements are electrically connected to said layer of conductive material and each of which is an elongated element with a vertical orientation;
- the conductive elements with a first polarity are distributed inside the casing in a regular pattern;
- the conductive elements with a first polarity are equidistantly distributed between the electrodes with a second polarity;
- each electrode with a second polarity is a vertical bar, which comprises a central core made of conductive material that is covered with a layer of active electrode material with a second polarity;
- the upper end section of each central core made of conductive material vertically extends through the cover for closing the vessel, and all the upper end sections of the central cores made of conductive material are electrically connected together by a collector plate arranged above the cover;
- the negative electrode (electrode with a first polarity) is cast into the vessel of the casing;
- the layer of active material of the electrode with a second polarity is covered with a peripheral layer of solid electrolyte;
- the lower end section of each electrode with a second polarity is fixed in an additional electrically insulated housing that is formed in the lower wall of the vessel of the casing;
- the first polarity is negative and the second polarity is positive;
- the layer of conductive material as a current collector of the electrode with a first polarity is a copper layer;
- the layer of conductive material for forming the current collector of the electrode with a second polarity is an aluminum layer;
- the active material of each electrode with a second polarity is a material that can belong to the NMC (LiNixMnyCozO2) category;
- the active material of each electrode with a first polarity is a material that can belong to the graphite category;
- the electrolyte is a polymer electrolyte or a cast ceramic/polymer hybrid electrolyte;
- the positive electrode contains an electronic conductive agent for ensuring electronic percolation;
- the negative electrode contains an electronic conductive agent for ensuring electronic percolation;
- the electrochemical cell is characterized in that:
  the mixture that forms the electrode with a first polarity is a mixture based on active material, electric conductive agent and solid electrolyte on the conductive elements with a first polarity covered with a copper coating;

a mixture that forms the electrode with a second polarity is a mixture based on active material, electronic conductive agent and solid electrolyte on the central cores made of conductive material covered with an aluminum coating;

an electrical insulating film between the electrodes with a first and second polarity is solid electrolyte;

the solid electrolyte is a polymer electrolyte or a ceramic/polymer hybrid material.

BRIEF DESCRIPTION OF THE FIGURES

Further features and advantages of the invention will become apparent upon reading the following detailed description, which can be understood with reference to the accompanying drawings, in which.

DETAILED DESCRIPTION OF THE INVENTION

For the description of the invention and in order to understand the claims, the vertical, longitudinal and transverse orientations will be adopted, by way of a non-limiting example and without reference to terrestrial gravity, according to the V, L, T coordinate system indicated in the figures, the longitudinal L and transverse T axes of which extend in a horizontal plane.

By convention, the transverse axis is oriented from back-to-front and the longitudinal axis is oriented from left-to-right.

Throughout the following description, identical or similar elements will be denoted using the same reference numerals.

Unless otherwise indicated, throughout the following description the terms conductive, conducting, insulating, polarity, polarized, etc. will be used with reference to the laws of electricity.

Figure 1:
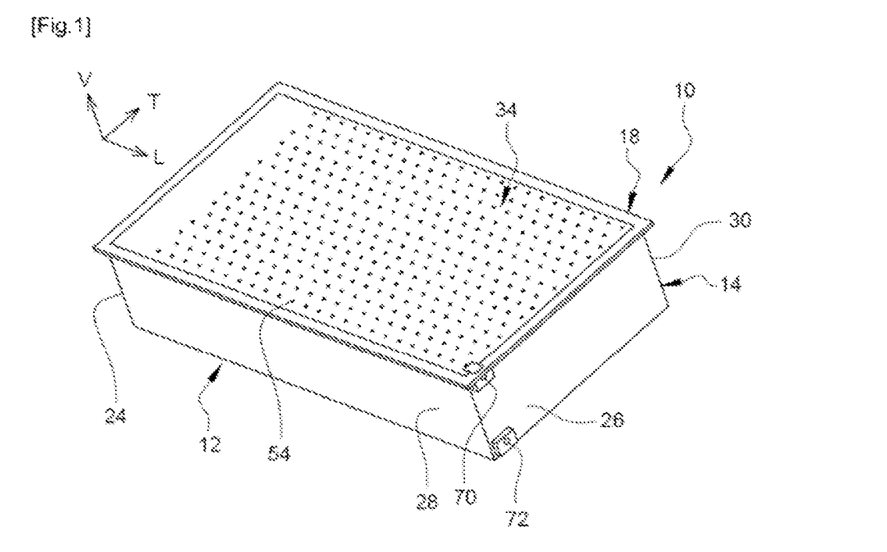
FIG. 1 is a schematic perspective view of an embodiment of an electrochemical cell according to the invention.
Figure 2:
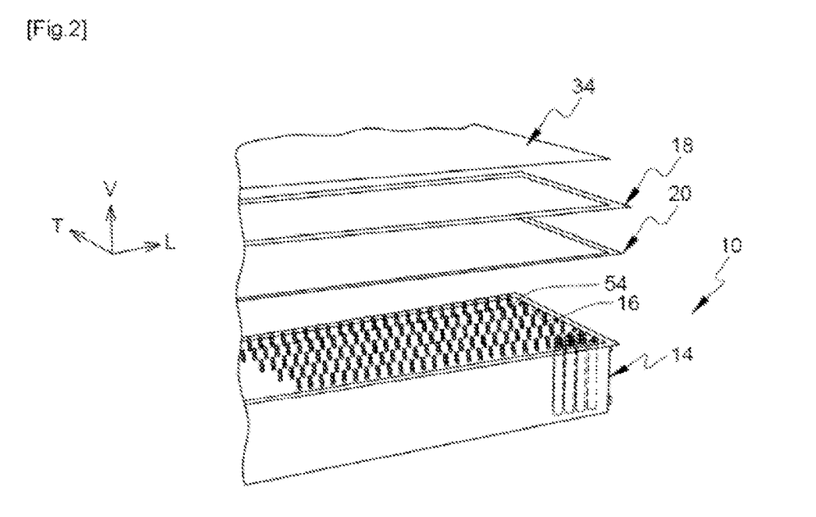
FIG. 2 is an exploded partial perspective view of some of the components of the electrochemical cell shown in FIG. 1.
Figure 3:
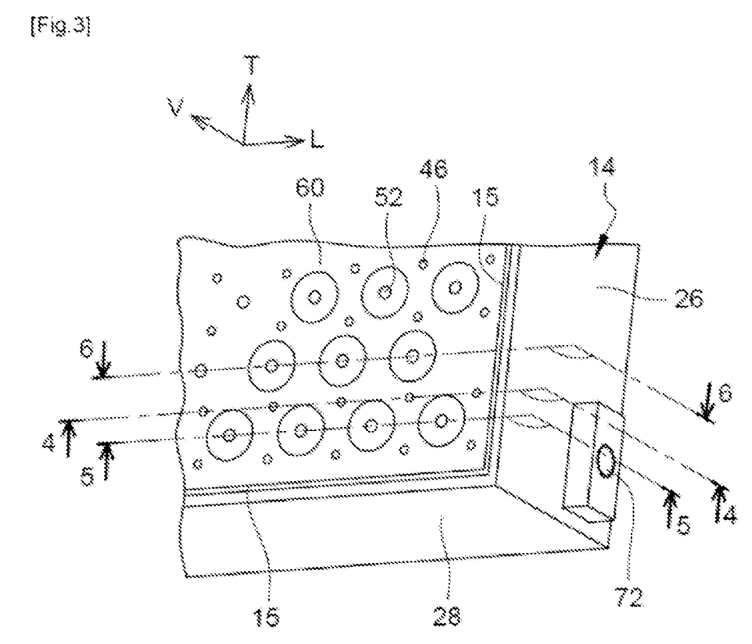
FIG. 3 is a partial perspective view along a horizontal cutting plane of the electrochemical cell shown in FIG. 1.

FIGS. 1 and 2 show an electrochemical cell 10, which, by way of a non-limiting example, in this case assumes a generally rectangular parallelepiped shape.

The electrochemical cell 10 thus comprises a rectangular parallelepiped casing 12, which is basically formed by a lower vessel 14, the upper face 16 of which is open vertically upward, and an upper cover 18 for sealably closing the lower vessel 14, in this case with the insertion of an annular seal 20 with a rectangular profile.

The lower vessel 14 comprises a horizontal bottom wall 22, two vertical and transverse left-hand 24 and right-hand 26 side walls, and two vertical front 28 and rear 30 longitudinal side walls.

Like the upper cover 18, the lower vessel 14 is made from an insulating synthetic material, in particular from a plastic or a composite material.

By way of a non-limiting example, the entire internal surface of the lower vessel 14, and in particular the upper face 23 of the bottom wall 22, is covered with a conductive metal layer 15, for example, copper, so as to form the current collector of the negative electrode of the electrochemical cell 10.

The copper layer 15 is, for example, produced by vapor deposition.

The upper cover 18 is in the general form of a rectangular plate and its lower face 17 is not coated with a conductive material. The upper cover 18 thus is an insulating element.

In addition, the lower face 17 is coated with a layer of electrically insulating material.

In its upper face 19, the upper cover 18 defines a housing 32 with a rectangular profile that accommodates and houses an upper collector plate or sheet 34 of matching shape and thickness, which in this case is made of aluminum.

The upper cover 18 and the collector 34 are perforated with a series of vertical through-holes 36 and 38, respectively, which are distributed over the entire available horizontal surface of the collector 32 in a regular pattern, in this case made up of transverse parallel alignments of rows of longitudinally aligned holes.

Figure 7:
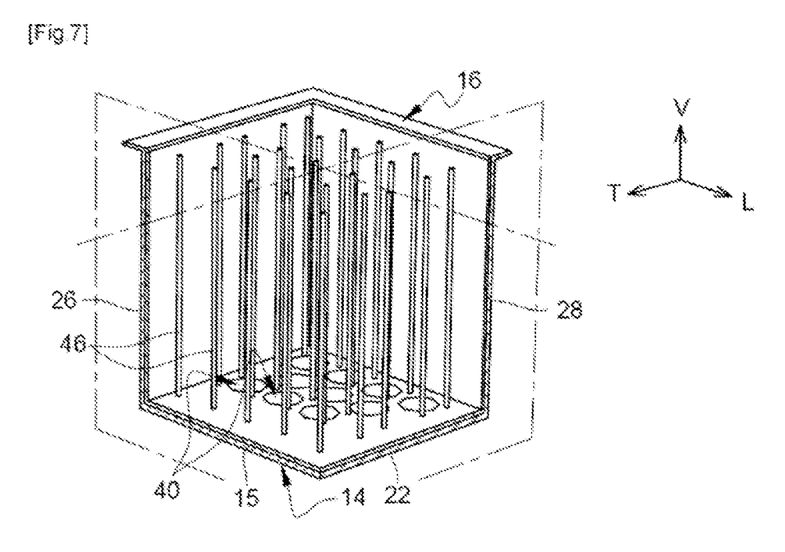
FIG. 7 is a perspective view that shows a portion of the vessel of the casing of the electrochemical cell of FIGS. 1 and 2.
Figure 8:
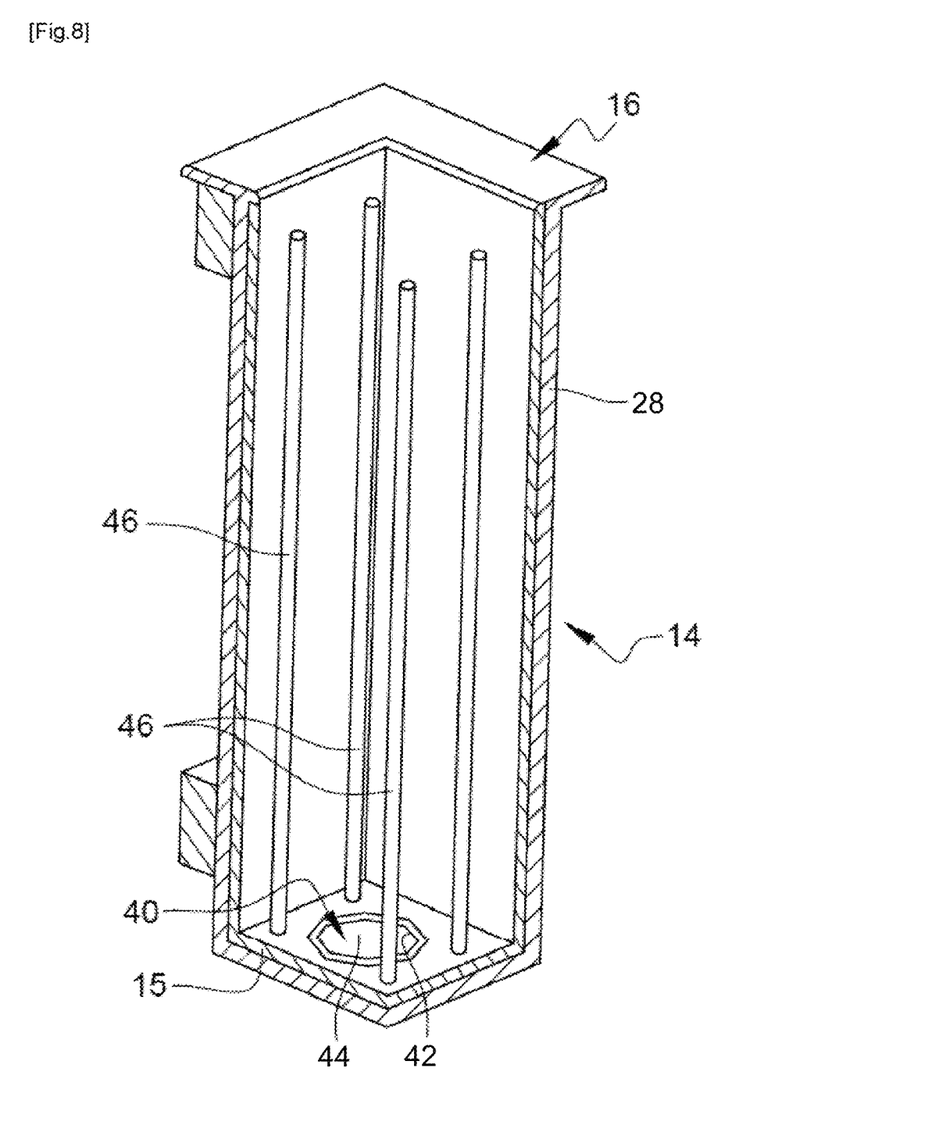
FIG. 8 is a larger scale view of the corner portion of the portion of the vessel shown in FIG. 7.

As can be particularly seen in FIG. 7, the horizontal bottom wall 22 of the lower casing 14 comprises a series of housings 40, which extend over a limited depth and each of which is defined by a generally cylindrical side wall 42 and by a flat horizontal bottom wall 44.

The walls 42, 44 of each housing 40 are devoid of any copper coating layer so that each housing 40 is an insulating housing.

The housings 40 are, for example, produced by molding when manufacturing the bottom wall 22. In order to prevent them from being coated with copper when the copper layer is deposited onto the remainder of the internal surface of the lower vessel 14, a mask for protecting the housings 40 can be used during the operation involving vapor deposition of the copper layer.

The entire available internal surface of the bottom wall 22 is provided with a series of housings 40, which are arranged in a staggered manner in a regular pattern in the form of longitudinal and transverse offset alignments.

The lower vessel 14 that forms the negative electrode of the electrochemical cell 10 comprises a series of conductive elements 46, each of which in this case is formed by a vertical rod that extends from the bottom wall 22 to which it is fixed.

Figure 4:
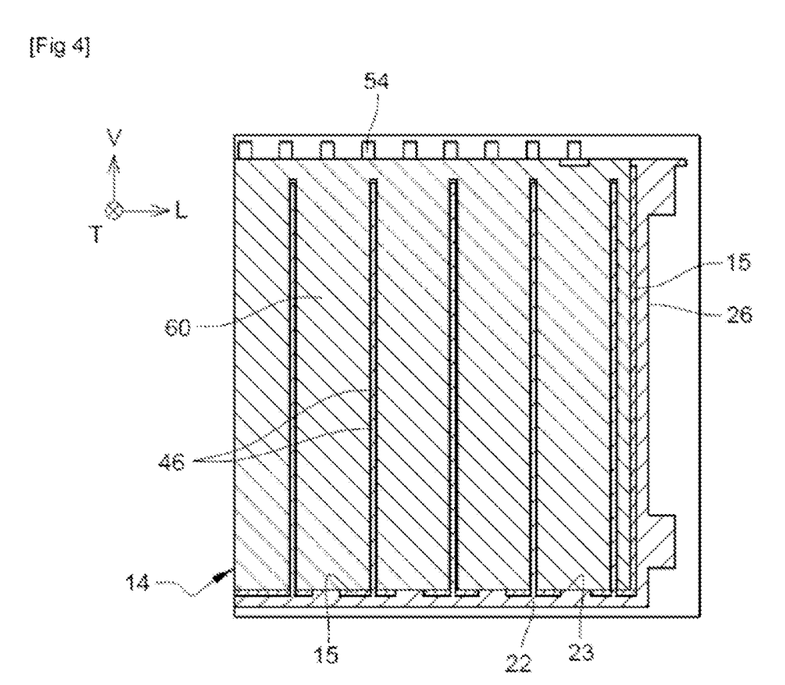
FIG. 4 is a partial section view along the vertical and longitudinal cutting plane 4-4 of FIG. 3.
Figure 5:
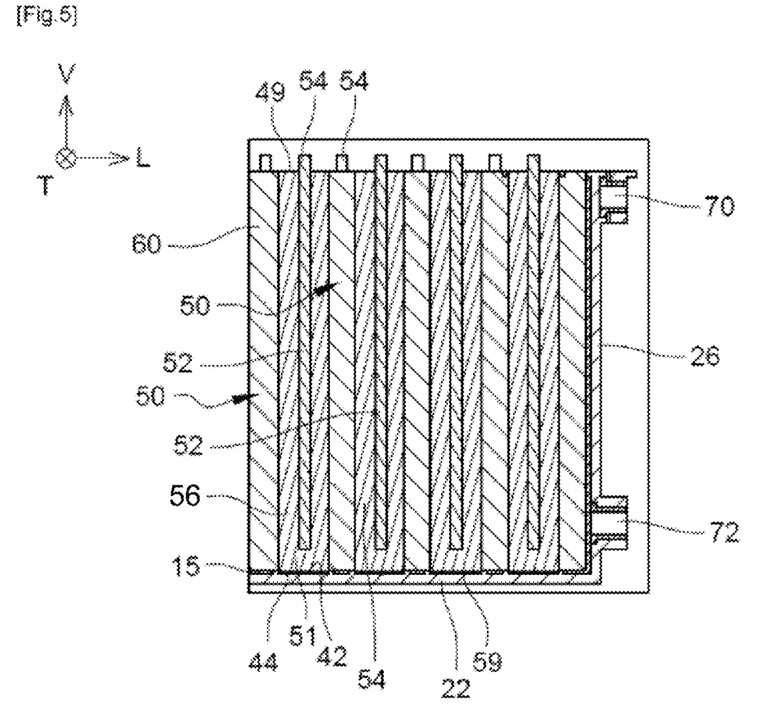
FIG. 5 is a partial section view along the vertical and longitudinal cutting plane 5-5 of FIG. 3.

As can be seen in FIG. 4, each rod 46 acting as a current collector of the negative electrode does not extend to the height of the upper cover 18 and a vertical clearance exists between the upper end of each rod 46 acting as a current collector of the negative electrode and the portion facing the lower face 17 of the upper cover 18.

Each rod 46 acting as a current collector of the negative electrode can be made of an insulating material and also can be coated with a layer of copper, which can be produced by deposition at the same time as the copper layer that coats the internal surface of the lower vessel 14.

The rods 46 acting as a current collector of the negative electrode made of conductive material or coated with a conductive material, such as the copper layer, are electrically connected to the conductive coating, in this case made of copper, of the internal surface of the lower vessel 14 so as to form "extensions" of the negative electrode that is inside the lower vessel 14.

The rods 46 acting as a current collector of the negative electrode are arranged over the entire available surface of the internal face of the bottom wall 22 and are distributed in a regular pattern, in this case each between three adjacent housings 40 as a triangle.

As can be particularly seen in FIG. 7, each housing 40 is directly surrounded by four rods 46 arranged as a square or even, depending on the longitudinal row to which the housing 40 belongs, it is surrounded by two transversely aligned rods 46, and this being in an equidistant manner relative to the housings 40.

Other geometric patterns and arrangements of the housings 40, of the rods 46 acting as a current collector of the negative electrode and of the vertical holes 36 and 38 are possible without departing from the scope of the invention.

According to the teaching of the invention, the positive electrode structure is a three-dimensional structure that is made up of a series of electrodes, each of which is in the form of a bar 50 with a vertical orientation.

By way of a non-limiting example, each bar 50 in this case is a cylindrical bar with a circular cross-section.

Each positive electrode bar 50 comprises a central hub or core 52, which in this case is an aluminum vertical central rod, the upper section 54 of which vertically extends beyond the horizontal upper face 49 of the cylindrical bar so as to be vertically received through the aligned holes 36 and 38 of the upper cover 18 and of the aluminum plate 34 forming a collector for all the positive electrodes 50 of the positive electrode three-dimensional structure of the electrochemical cell 10.

As an alternative embodiment, each central core 52 can be made of insulating material externally coated with an aluminum layer. Each central core 52 connected to the plate 34 acts as a current collector.

The diameter of each central core 52 is, for example, equal to approximately two millimeters and it is externally coated with a layer 56, which is a mixture of positive electrode material and solid electrolyte and which is produced by dip coating.

The positive electrode material is, for example, a material belonging to the "NMC" category, for which the general definition of the composition is (LiNixMnyCozO2), in which x, y and z correspond to the stoichiometric proportions of the various components.

The radial thickness of the tubular layer 56 of positive electrode material is, for example, four millimeters.

By way of an example, the height of each positive electrode bar 50, which is defined by its opposite upper 49 and lower 51 horizontal faces, is, for example, two hundred millimeters.

By way of a non-limiting example, the layer 56 of positive electrode material is externally coated with an additional thin layer of solid electrolyte coating, which preferably is the same as the solid electrolyte of the electrochemical cell 10, the composition and the production of which will be described hereafter.

The peripheral layer of solid electrolyte coating that is formed on each positive electrode bar 50 is produced, for example, by dip coating the bar made up of its central core 52 and its layer 56 of positive electrode material, made up of the active material and of the electrolyte, which has been previously heated and melted in order to then be dipped in the electrolyte, which is also previously heated and melted.

Once cooled, the solid electrolyte coating film is formed over the entire outer peripheral surface of the positive electrode bar 50. This film acts as a separator, by electrically insulating the positive and negative electrodes. Its thickness varies as a function of the viscosity of the selected mixture containing the electrolyte in polymer form.

The thickness is, for example, of the order of twenty microns in order to provide good mechanical strength and sufficient electrical insulation between the positive 50 and negative 60 electrodes.

Figure 9:
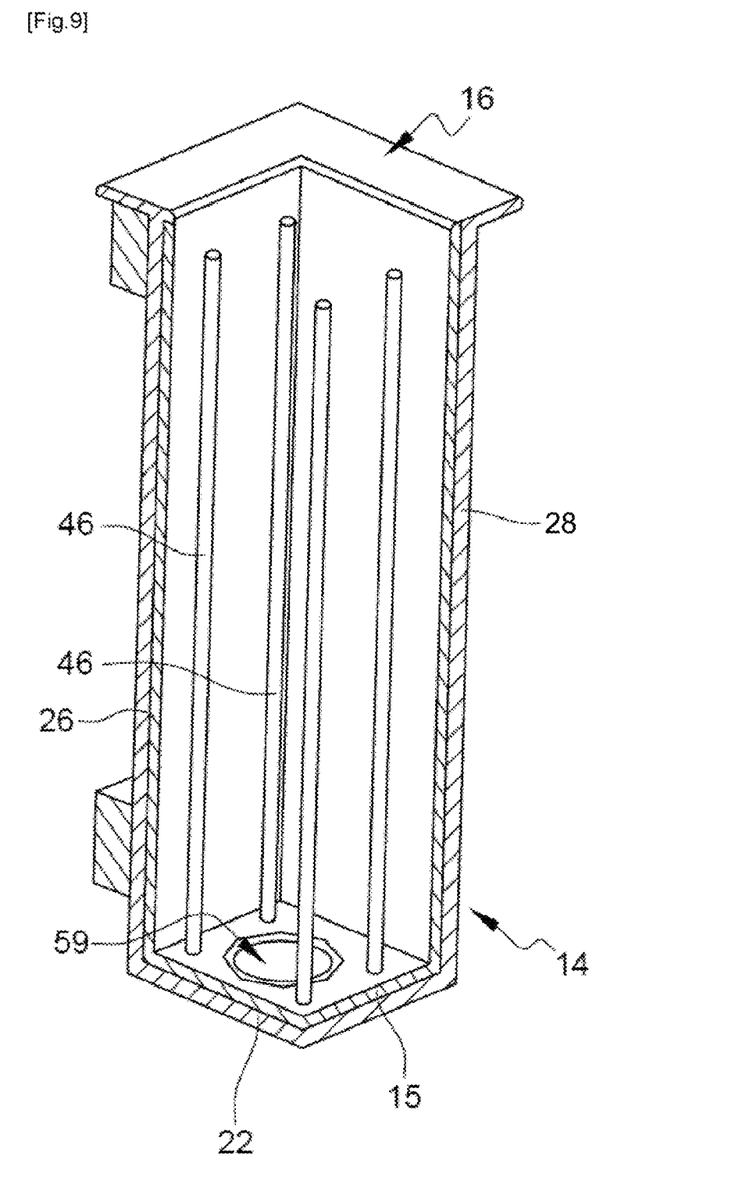
FIG. 9 is a view similar to that of FIG. 8 that shows a first manufacturing step with a view to fixing one of the positive electrodes in the form of a bar in the bottom of the vessel.
Figure 10:
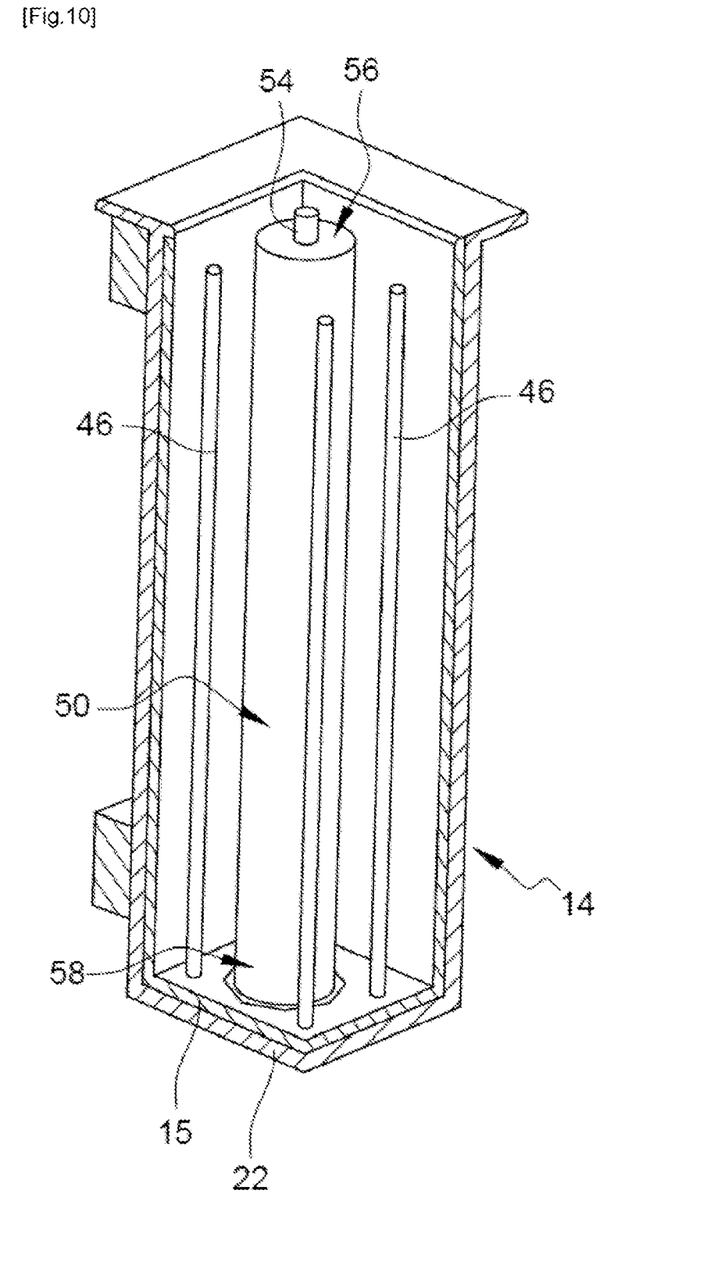
FIG. 10 is a view similar to those of FIGS. 8 and 9 that shows the electrode in a position whereby it is mounted and fixed in its housing formed in the bottom of the vessel.

For mounting and fixing each positive electrode bar 50, the free lower end section 58 of each positive electrode bar 50 is received and is fixed in an associated housing 40 of the bottom wall 22 of the lower vessel 14.

Fixing is provided, for example, by a bonding operation by means of a drop of insulating glue or by means of a drop of molten polymer electrolyte 59 deposited into the bottom 44 of the associated housing 40.

Figure 6:
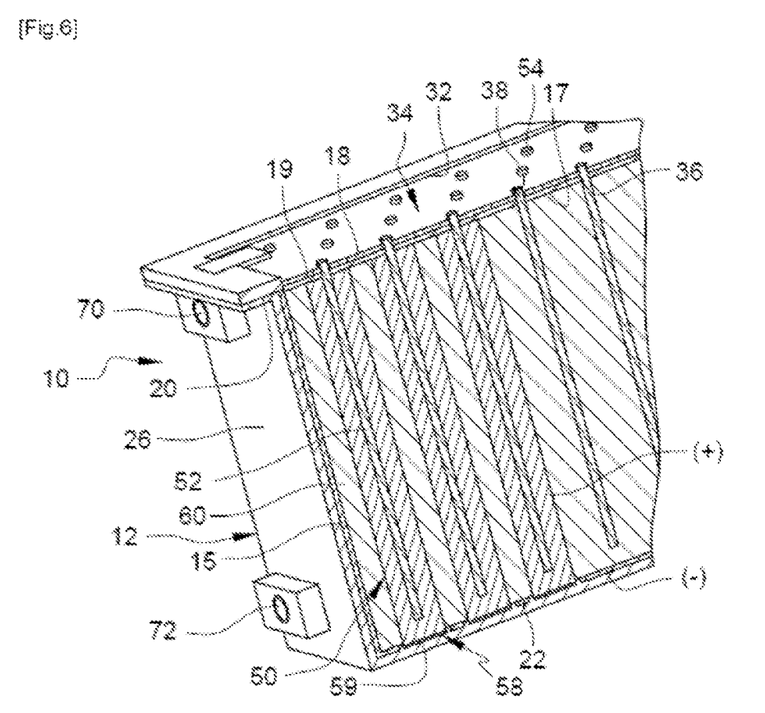
FIG. 6 is a partial section view along the vertical and longitudinal cutting plane 6-6 of FIG. 3.

As can be particularly seen in FIG. 6, each positive electrode bar 50 substantially extends over the entire internal height of the casing 12 and its upper end face 49 is adjacent to the internal face 17 of the upper cover 18.

The electrochemical cell 10 finally comprises a negative electrode mixture 60, comprising an electrolyte, which in this case is a solid electrolyte, and the active material, for example, graphite. The mixture 60 is cast into the lower vessel 14, in particular around the positive electrode bars 50 and the rods 46 acting as a current collector of the negative electrode.

After being cast and cooled, the mixture 60 is set. The mixture completely fills the space available inside the lower vessel 14.

The lower vessel 14 is then sealably closed by the upper cover 18 with the upper free end sections 54 of the cores 52 of the positive electrode bars 50 that pass through the upper cover 18 and the outer aluminum plate 34.

The assembly forming the outer aluminum plate 34 and the upper free end sections 54 for connecting the positive electrode bars 50 then can be hermetically protected from the external environment.

The electrical connection of the positive electrodes with an external electrical circuit is implemented by means of an aluminum conductive connection fitting 70, which is connected to the plate 34 and which is arranged on the upper part of the right-hand side wall 26.

The electrical connection of the negative electrode with an external electrical circuit is implemented by means of a copper conductive connection fitting 72, which is connected to the copper layer 15 and which is arranged on the lower part of the right-hand side wall 26.

Advantageously, the design according to the invention allows a "solid" electrochemical cell 10 to be produced that is produced and implemented without any solvent, which has the advantage of avoiding the formation of porosities.

The dimensions of the positive electrodes 50 and of the negative electrode casing 12 can vary within significant ranges. Depending on the application and, for example, in order to maximize the stored energy capacity, for example, as applied to a power battery for a motor vehicle with an electric traction motor, a casing that is several tens of centimeters long can be selected with very thick electrodes, namely a few millimeters thick.

For a lower capacity and less bulky system, the size of the casing can be reduced while retaining electrodes with the same dimensions.

If the intention is to have significant available power, the thicknesses of the electrodes can be reduced in order to reduce the ionic diffusion times in the electrolyte.

By virtue of the invention, all the negative and positive electrode sub-assemblies are mounted in parallel, thereby increasing the energy density of the battery system.

The techniques proposed for producing the negative three-dimensional electrode formed by the lower vessel 14 that can be produced by molding, and for producing the positive three-dimensional electrode allow electrode thicknesses to be produced that are much greater than those obtained using the current conventional liquid coating techniques, which are at most one hundred microns thick.

The fact that the electrodes can be compartmentalized in the form of a rigid vessel containing a solid electrolyte allows the risks of short-circuiting to be reduced compared to the conventional designs using a stack of flat electrodes.

Furthermore, the electrical configuration of the electrochemical cell system according to the invention is adaptable in the sense that the value of the voltage can be selected.

The invention claimed is:

1. An electrochemical cell, comprising:
    a casing that:
    comprises a lower first element in the form of a vessel, an internal surface of which is at least partially covered by a layer of conductive material so as to form a current collector of a first electrode with a first polarity;
    comprises an upper second element in the form of a cover for closing the vessel;
    houses a three-dimensional electrode structure with a first electric polarity;
    houses a three-dimensional electrode structure with a second electric polarity opposite to the first electric polarity; and
    contains an electrolyte as an ionic conductive medium,
    wherein the three-dimensional electrode structure with the second electric polarity comprises a series of electrodes with a second polarity, each of the electrodes with the second polarity is a vertical bar, which comprises a central core made of conductive material that is covered with a solid layer of electrolyte and of active electrode material with the second polarity,
    wherein an upper end section of each of the central cores made of conductive material vertically extends through the cover for closing the vessel, and all the upper end sections of the central cores made of conductive material are electrically connected together by a collector plate arranged above the cover.

2. The electrochemical cell as claimed in claim 1, wherein the electrodes with the second polarity are distributed inside the casing in a regular pattern.

3. The electrochemical cell as claimed in claim 1, wherein the vessel houses a series of conductive elements with the first polarity, and the conductive elements are electrically connected to said layer of conductive material and each of which is an element of elongated shape with a vertical orientation.

4. The electrochemical cell as claimed in claim 3, wherein the conductive elements with the first polarity are distributed inside the casing in a regular pattern.

5. The electrochemical cell as claimed in claim 4, wherein the electrodes with the second polarity are distributed inside the casing in a regular pattern and wherein the conductive elements with the first polarity are equidistantly distributed between the electrodes with the second polarity.

6. The electrochemical cell as claimed in claim 1, wherein a mixture for forming the electrode with the first polarity is a solid electrolyte-based mixture cast into the vessel of the casing.

7. The electrochemical cell as claimed in claim 6, wherein the layer of active material of the electrode with the second polarity is covered with a peripheral layer of said solid electrolyte.

8. The electrochemical cell as claimed in claim 1, wherein a lower end section of each electrode with the second polarity is fixed in an additional electrically insulated housing that is formed in a lower wall of the vessel of the casing.

9. The electrochemical cell as claimed in claim 1, wherein the first polarity is negative and the second polarity is positive.

10. The electrochemical cell as claimed in claim 9, wherein:
    a mixture for forming the electrode with the first polarity is a solid electrolyte-based mixture cast into the vessel of the casing,
    the mixture that forms the electrode with the first polarity is a mixture based on active material, electric conductive agent, and solid electrolyte on the conductive elements with the first polarity covered with a copper coating,
    a mixture that forms the electrode with the second polarity is a mixture based on active material, electronic conductive agent, and solid electrolyte on the central cores made of conductive material covered with an aluminum coating,
    an electrical insulating film between the electrodes with the first polarity and the electrodes with the second polarity is solid electrolyte, and
    the solid electrolyte is a polymer electrolyte or a polymer/ceramic hybrid material.

11. The electrochemical cell as claimed in claim 1, wherein the solid layer of electrolyte is a dip coated layer on an exterior surface of the central core.

12. The electrochemical cell as claimed in claim 1, wherein a diameter of the central core is 2 millimeters and a radial thickness of the solid layer of electrolyte is 4 millimeters.

13. The electrochemical cell as claimed in claim 1, wherein the vessel includes a bottom wall and vertical side walls, a conductive fitting is arranged on a lower part one of the vertical side walls, and a lower end section of each of the central cores extends below the conductive fitting.

* * * * *